United States Patent [19]

Culbertson et al.

[11] 4,384,093

[45] May 17, 1983

[54] COPOLYMERS DERIVED FROM 1,3 DIOXEPINS AND MALEIC ANHYDRIDE OR MALEIMIDES AND METHODS

[75] Inventors: Billy M. Culbertson, Worthington, Ohio; Ann E. Aulabaugh, Madison, Wis.

[73] Assignee: Ashland Oil, Inc., Ashland, Ky.

[21] Appl. No.: 254,499

[22] Filed: Apr. 15, 1981

[51] Int. Cl.³ .................... C08F 26/08; C08F 24/00
[52] U.S. Cl. .................... 526/266; 525/113; 525/114; 526/262
[58] Field of Search ............. 526/262, 266, 270, 271

[56] References Cited

U.S. PATENT DOCUMENTS

| | | | |
|---|---|---|---|
| 2,861,056 | 11/1958 | Minsk | 526/271 |
| 3,116,299 | 12/1963 | Sterling et al. | 260/338 |
| 3,219,629 | 11/1965 | Sterling | 260/63 |
| 3,280,148 | 10/1966 | Pawloski et al. | 260/338 |
| 3,337,587 | 8/1967 | Tinsley et al. | 260/338 |
| 3,385,832 | 5/1968 | Jennings et al. | 260/73 |
| 3,410,871 | 11/1968 | Sturzenegger | 260/338 |
| 3,471,458 | 10/1969 | Mehmedbasich | 260/78.5 |
| 3,796,694 | 3/1974 | Heilman | 526/271 |
| 4,008,186 | 2/1977 | Scaggs | 526/258 |

OTHER PUBLICATIONS

*Ketals From 2,2-Dimethoxypropane*, "Preparation of Ketals from 2,2-Dimethoxypropane", N. B. Lorette and W. L. Howard, Apr. 1960, pp. 521–525.
"Preparation and Properties of 1,3-Dioxep-5-enes", K. C. Brannock and G. R. Lappin, Dec. 1956, pp. 1366–1368.
*Chem. Heterocycl. Compounds*, "Dioxepins and Trioxepins", C. E. Pawloski, 1972, pp. 319–411.

*Primary Examiner*—Harry Wong, Jr.
*Attorney, Agent, or Firm*—Wood, Herron & Evans

[57] ABSTRACT

Copolymers and terpolymers formed by reacting either 4,7-dihydro-1,3-dioxepins or 6,7-dihydro-1,3-dioxepins with maleic anhydride and/or a maleimide. The copolymers are characterized as linear, low molecular weight, water soluble alternating copolymers. These copolymers are useful as a water soluble polymer, as epoxy resin modifies and curing agents. The copolymers formed from 4,7-dihydro-1,3-dioxepins and maleic anhydride can be rearranged to form a poly (γ-crotonlactone) having the following general formula:

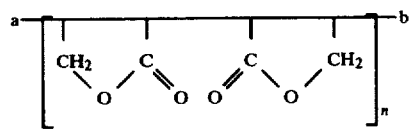

10 Claims, No Drawings

COPOLYMERS DERIVED FROM 1,3 DIOXEPINS AND MALEIC ANHYDRIDE OR MALEIMIDES AND METHODS

BACKGROUND OF THE INVENTION

The present invention relates to copolymers and terpolymers formed by the free radical initiated polymerization of either 4,7-dihydro-1,3-dioxepins or 6,7-dihydro-1,3-dioxepins with a maleic anhydride or a maleimide or a mixture of them.

The present invention further relates to the method of making these copolymers.

Furthermore, the present invention relates to the formation of a polylactone having, for example, the following general formula:

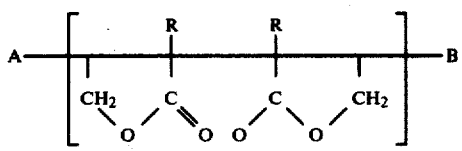

which can be formed from certain of the copolymers mentioned above.

The copolymers and terpolymers of the present invention are useful as epoxy resin modifiers and curing agents. The resulting systems are useful as coatings, adhesives and other applications.

Dioxepins are useful as solvents. Therefore, a polymer formed from a dioxepin and one or more additional monomers would be expected to possess the advantageous characteristic of improving the compatability of the additional monomer with respect to a third moiety. This would also provide the physical advantages of putting the additional monomers in a polymer. Thus, when the additional monomers were used in any type of coating application using the polymer of the present invention, it would be expected to improve the strength of the coating.

Finally, dioxepin is dermatologically safe. Therefore, a copolymer formed from dioxepin and a second dermatologically safe monomer would presumably provide a dermatologically safe copolymer.

The problem is to copolymerize or terpolymerize dioxepin. U.S. Pat. No. 3,385,832 discloses a copolymer formed from trioxane and dioxepin. But the dioxepin ring is broken in the formation of the polymer. U.S. Pat. No. 3,280,148 discloses a bis-dioxepin and broadly states that this monomer is copolymerizable with vinyl monomers. Sterling U.S. Pat. No. 3,219,629 discloses a copolymer of certain vinyl monomers and 1,3-dioxepins. However, the polymers do not contain a high percentage of the dioxepin moiety in the polymer. In fact, in these systems, the dioxepin acts as a chain transfer agent, thereby limiting the size of the polymer. As the concentration of dioxepin is increased, the reaction is decreased and the size of the polymers being formed is also decreased.

Dioxepin does not copolymerize readily with typical vinyl monomers, particularly with any substantial amount of the dioxepin moiety. In fact, dioxepin does not even homopolymerize. Therefore, it is unexpected for dioxepin to copolymerize. But, according to the present invention, dioxepin does copolymerize with certain electron-accepting monomers to form a copolymer containing approximately 50 mole percent dioxepin. These electron-accepting monomers comprise maleic anhydrides and maleimides. Thus, it has been discovered, contrary to these indications, that 1,3-dioxepins copolymerize with maleic anhydride or a maleimide, thus allowing a copolymer with the characteristics of a maleic anhydride or maleimide combined with the benefits of the dioxepin, i.e., the increased compatability and dermatological safety.

The copolymer formed with maleic anhydride can further be rearranged to form a polylactone. The most important of these polylactones is shown below (I):

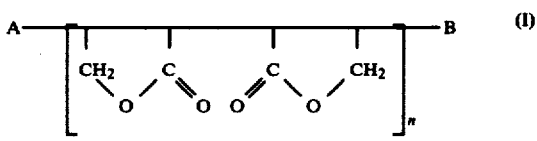

This polymer itself is useful as an epoxy curative and generally as a modifier in polyblends.

DETAILED DESCRIPTION OF THE INVENTION

The present invention comprises a polymer formed from a first monomer which is a 1,3-dioxepin having one of the following general formulas (II), (III):

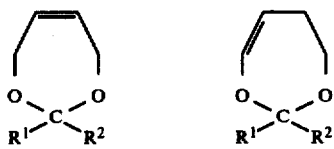

(4,7-dihydro 1,3 dioxepin)    (6,7-dihydro 1,3 dioxepin)

(II)                   (III)

and at least one additional or second monomer selected from one or more of the following monomers (IV), (V):

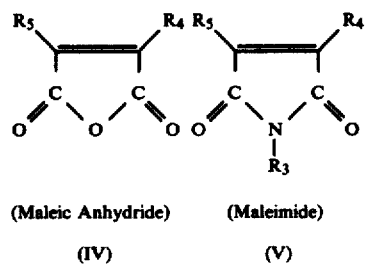

(Maleic Anhydride)    (Maleimide)

(IV)                (V)

With respect to the present invention, maleic anhydride and maleimides are similar in that they both tend to be electron-accepting monomers. Maleic anhydride also includes substituted maleic anhydride in which the maleic moiety continues to be a strong electron-accepting monomer. Specifically included are chloromaleic anhydride and methylmaleic anhydride.

In the preceeding formulas and throughout this document, $R^1$ and $R^2$ represent hydrogen, alkyl, substituted alkyl, aryl and substituted aryl. $R^1$ and $R^2$ can also be bonded to each other such as shown, for example, by the following monomer:

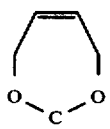

wherein y is 4, 5 or 6.

The moiety $R^3$ attached to the nitrogen in the maleimide represents hydrogen, alkyl, substituted alkyl, aryl and substituted aryl groups.

With respect to $R^1$, $R^2$, and $R^3$, these do not represent groups which would interfere with the polymerization or interact with the maleic anhydride or maleimide. Groups which are specifically not represented by $R^1$, $R^2$, and $R^3$ include: amine, thiol, alcohol, and strong acids.

$R^4$ and $R^5$ represent any groups which would not prevent the maleic anhydride or the maleimide from acting as a strong electron-accepting monomer, and include hydrogen, and short chain aliphatic hydrocarbons as well as halides.

Preparation of 1,3-dioxepins useful in the present invention can be prepared by means well known in the prior art such as reacting cis-2-butene-1,3-diol with an aldehyde or ketone. Such reactions are usually catalyzed by the use of a strong acid. These methods and other methods for the production of 1,3-dioxepins are reviewed by Pawloski in *Chemistry of Heterocyclic Compounds*, 26, 319–411 (1972).

These methods generally disclose the formation of 4,7-dihydro-1,3-dioxepins. It is also well known that the 4,7-dihydro-1,3-dioxepins can be rearranged to form corresponding 6,7-dihydro-1,3-dioxepins using potassium t-butoxide (KOt-Bu) in t-butyl alcohol as illustrated by the following equation (IV):

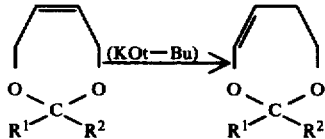

The formation of polymers according to the present invention is accomplished by free radical polymerization. Suitable initiators include azodiisobutyronitrile, di-tert butyl peroxide, lauryl peroxide, and benzoyl peroxide.

The polymerization may be effected in bulk or in solution.

Where a bulk process is used, the polymerization is normally carried out at a temperature at which an initiator will perform and the temperature should not be so high that the dioxepin decomposes. It is preferred to effect polymerization at temperatures from about 70° C. to 120° C.

Where the polymerization is effected in solution, the solvents should be substantially anhydrous. Suitable solvents include ethyl acetate, 1,2 dichloroethane, toluene, 2-butanone, cyclohexanone, and xylene. Alcohols and amines would not be suitable for the present invention since they react with the maleic anhydride.

When effecting the polymerization in solution, the temperature should be between 70° C. to 120° C.

The time of the reaction in solution will vary depending on the reagents, initiators and solvents, but generally will vary between 4 to 8 hours. The completion of the reaction can be determined by analysis of the reagents for unreacted olefins to determine when the reaction has stopped.

Stoichiometrically, the reaction should be conducted with a one to one molar proportion of 1,3-dioxepin to either the maleic anhydric or the maleimide or the mixture of maleic anhydride and maleimide. To insure a 1:1 polymer, it is preferable to have a slight molar excess of dioxepin. The dioxepin is also easier to separate.

The polymerization should preferably be conducted in an inert, dry atmosphere to avoid contamination or oxidation of the reagents. Suitable atmospheres include helium and nitrogen, which is preferred.

According to the preceeding method, copolymers and terpolymers containing a 1,3-dioxepin and maleic anhydride, and/or a maleimide having one of the two following general formulas are prepared. When a 4,7-dihydro-1,3-dioxepin is used, the polymer represented by formula V is formed, and when a 6,7-dihydro-1,3-dioxepin is reacted and the polymer represented by formula VI is produced:

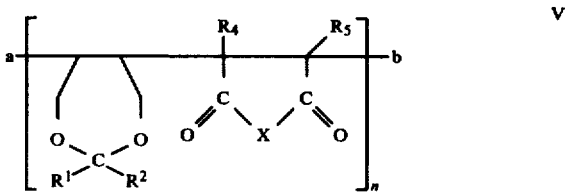

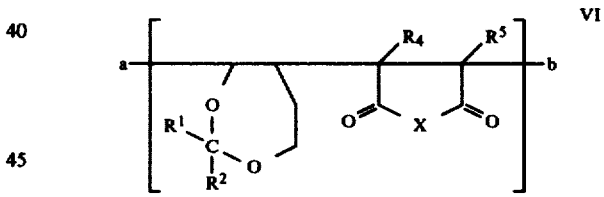

where x represents either O or N-$R^3$ and A and B represent the terminal groups of the polymer chain. n will vary depending on reaction conditions and will generally vary between approximately 10 and 50.

The preparation of these polymers is further illustrated by the following non-limiting examples:

EXAMPLE 1

(Copolymer of 2,2-Dimethyl-4,7-dihydro-1,3-dioxepin and Maleic Anhydride)

A solution of 0.21 g AIBN in 9.40 g dichloroethane was added in four increments over a period of 3.0 hours to a heated (77° C.) solution of 7.35 g maleic anhydride and 9.61 g 2,2-dimethyl-4,7-dihydro-1,3-dioxepin under nitrogen. The solution was heated an additional four hours at 77° C. The reaction mixture was then diluted with acetone, added to diethyl ether, filtered, and dried to yield 12.7 g (75%) polymer. NMR analysis confirmed a 1:1 copolymer composition.

EXAMPLE 2

(Copolymer of 4,7-Dihydro-1,3-dioxepin and Maleic Anhydride)

Following the general procedure in Example 1, a solution of 0.17 g AIBN in 12.30 g dichloroethane was added in 4 increments over a period of 3.5 hours to a heated solution (78° C.) of 7.35 g maleic anhydride and 7.51 g 4,7-dihydro-1,3-dioxepin under nitrogen. The solution was heated an additional two hours at 78° C. The reaction mixture was then diluted with acetone, added to diethyl ether and filtered. After drying, 11 grams (75%) polymer was obtained.

EXAMPLE 3

(Copolymer of 4,7-Dihydro-1,3-dioxepin and N-Phenylmaleimide)

A solution of 12.99 g N-phenylmaleimide, 7.51 g 4,7-dihydro-1,3-dioxepin, 0.44 g AIBN, 6.83 g tetrahydrofuran, and 6.83 g methyl ethyl ketone, was heated at 58°-60° C. over a period of 21 hours under nitrogen. The reaction mixture was then diluted with tetrahydrofuran, added to a 4/1 (v/v) mixture of diethyl ether and petroleum ether, filtered, and dried to yield 15.2 g (74%) polymer.

EXAMPLE 4

(Copolymer of 7,12-dioxaspiro [5.6] dodec-9-ene and Maleic Anhydride)

A solution of 16.8 g (0.1 mol) 7,12-dioxaspiro [5.6] dodec-9-ene, 9.8 g (0.1 mol) maleic anhydride, 0.39 g azodiisobutyronitrile and 15 g 1,2-dichloroethane was stirred and heated under nitrogen for 6 hours at 80°-85° C. The viscous solution was cooled, diluted with acetone and added slowly to vigorously stirred diethyl ether to precipitate the copolymer. After drying, the copolymer was collected in a 22 g (theory, 26.6 g) yield, with a weight average molecular weight estimated by gel permeation chromatography of 6250.

EXAMPLE 5

(Copolymer of 7,12-dioxaspiro [5.6] dodec-8-ene and Maleic Anhydride)

A solution of 16.8 g (0.1 mol) 7,12-dioxaspiro [5.6] dodec-8-ene, 9.8 g (0.1 mol) maleic anhydride, 15.0 g 1,2-dichloroethane and 0.39 g AIBN was stirred and heated under nitrogen for six hours at 80°-85° C. The copolymer was isolated in the same monomer as Example 1, obtaining an 18.4 g (theory, 26.6 g) yield of white material of comparable molecular weight to previous copolymer.

EXAMPLES 6–16

The following examples shown at Table I demonstrate the production of 4,7-dihydro-1,3-dioxepin maleic anhydride copolymer using the indicated solvent, initiator, and conditions.

TABLE 1

4,7-DIHYDRO-1,3-DIOXEPIN - MA COPOLYMERIZATIONS[a]

| | Solvent (% Solids) | | Initiator, (Wt. %) | Temp. °C. | Time, Hr. | Yield % | $M_w$ ($M_w/M_n$)[b] |
|---|---|---|---|---|---|---|---|
| 6 | Ethyl Acetate | (60) | AIBN (1.5) | 75 | 7.0 | 62 | — |
| 7 | 1,2-Dichloroethane[e] | (55) | AIBN (1.5) | 80 | 7.0 | 75 | 1800 (1.61) |
| 8 | Toluene | (60) | AIBN[c] (1.5) | 80 | 5.0 | 55 | — |
| 9 | 2-Butanone | (60) | AIBN[c] (1.5) | 75 | 8.0 | 60 | — |
| 10 | 2-Butanone | (60) | BPO (1.5) | 80 | 20.0 | 54 | — |
| 11 | 1,2-Dichloroethane[e] | (60) | AIBN[d] (1.5) | 75 | 7.0 | 64 | 2850 (1.95) |
| 12 | 50/50 (w/w) 1,2-Dichloroethane/Ethyl Acetate | (60) | AIBN (1.5) | 75 | 6.0 | 76 | 1700 (1.60) |
| 13 | 2-Butanone | (60) | AIBN[c] (1.5) | 80 | 8.0 | 65 | — |
| 14 | 2-Butanone | (60) | AIBN[c] (1.5) | 75 | 7.0 | 52 | — |
| 15 | Cyclohexanone | (60) | DTBP (1.5) | 130 | 7.0 | 32 | — |
| 16 | 2-Butanone | (40) | AIBN (2.0) | 80 | 17.0 | 71 | 1264 (1.44) |

[a]All polymerizations run under $N_2$ with 1:1 feed ratios. Yields based on polymer recovered when polymerization solutions added to nonsolvent diethyl ether. The copolymers were soluble in acetone, chloroform, ethyl acetate, N,N—dimethyl formamide, dimethylsulfoxide and tetrahydrofuram.
[b]Estimated from gel permeation chromatography data.
[c]Initiator added incrementally during polymerization.
[d]$ZnCl_2$ (1% by wt.) added.
[e]Polymer precipitated during reaction.

EXAMPLES 17–27

Examples 17–27 demonstrate the copolymerization of various substituted 1,3-dioxepins with maleic anhydride. These examples are shown in Table 2.

TABLE 2

ASSORTED 1,3-DIOXEPIN - MA COPOLYMERIZATIONS[a]

| | 1,3-Dioxepin | Solvent (% Solids) | | AIBN Init. Wt. % | Temp., °C. | Time, Hr. | % Yield[e] | $M_w$ ($M_w/M_n$)[f] |
|---|---|---|---|---|---|---|---|---|
| 17 | 4,7 Dihydro 2,2-dimethyl 1,3-dioxepin | 2-Butanone | (65) | 2.0 | 75–80 | 8.0 | 60 | 6,400 (2.09) |
| 18 | 4,7 Dihydro 2,2-dimethyl 1,3-dioxepin | Ethyl Acetate/ 1,2-Dichloroethane | (60)[b] | 2.0 | 75–80 | 7.0 | 46 | — |
| 19 | 4,7 Dihydro 2,2-dimethyl 1,3-dioxepin | 1,2-Dichloroethane | (65) | 3.0[c] | 75–80 | 7.0 | 65 | 2100 (1.61) |
| 20 | 4,7 Dihydro 2,2-dimethyl 1,3-dioxepin | 1,2 Dichloroethane | (60) | 1.5[d] | 75–80 | 7.0 | 75 | 8,100 (1.80) |
| 21 | 4,7 Dihydro 2,2-dimethyl 1,3-dioxepin | 1,2-Dichloroethane | (85) | 1.0 | 75 | 6.5 | 55 | — |
| 22 | 4,7 Dihydro 2 phenyl 1,3-dioxepin | 1,2-Dichloroethane | (75) | 1.5 | 75–80 | 6.0 | 65 | 3,400 (2.00) |
| 23 | 4,7 Dihydro 2 isopropyl 1,3-dioxepin | Neat | | 2.0 | 75–80 | 7.0 | 47 | 2,000 (1.35) |

TABLE 2-continued

ASSORTED 1,3-DIOXEPIN - MA COPOLYMERIZATIONS[a]

| | 1,3-Dioxepin | Solvent (% Solids) | | AIBN Init. Wt. % | Temp., °C. | Time, Hr. | % Yield[e] | $M_w$ $(M_w/M_n)$[f] |
|---|---|---|---|---|---|---|---|---|
| 24 | 4,7 Dihydro 2 isopropyl 1,3-dioxepin | 2-Butanone | (60) | 2.0 | 75 | 22.0 | 53 | 1,600 (1.27) |
| 25 | 4,7 Dihydro 2 alkyl 1,3-dioxepin | 2-Butanone | (65) | 3.0 | 75 | 3.0 | — | Hard Gel |
| 26 | 4,7 Dihydro 2 ethyl 1,3-dioxepin | 1,2-Dichloroethane | (60) | 1.5 | 70–75 | 5.5 | — | Hard Gel |
| 27 | 7,12 dioxaspiro[5.6] dodec-9-ene | 1,2-Dichloroethane | (65) | 1.5 | 85 | 7.0 | 80 | — |

[a]Monomer feed ratios were 1:1 for all copolymerizations. Polymer precipitated as formed in 1,2-dichloroethane solutions. The copolymers were soluable in acetone, chloroform, ethyl acetate, tetrahydrofuran and other polar solvents.
[b]Solvent mixture was a 50/50 (w/w) blend.
[c]Dichloroethane solution of AIBN added continuously during reaction.
[d]Dichloroethane solution of AIBN added in four equal increments during reaction.
[e]Yields determined from precipitated polymer recovered when polymerization solutions added to nonsolvent diethyl ether.
[f]Inherent viscosities ($n_{inh}$) of the copolymers varied from 0.05–0.12 (0.4g/100 ml DMF, 25° C.). Molecular weights and dispersity values estimated by GPC.

The following example demonstrates the utility of the present copolymer as epoxy curatives.

EXAMPLE 29

(Epoxy Cure Study)

1.50 g (0.013 eq.) poly (2,2-dimethyl-4,7-dihydro-1,3-dioxepin-co-maleic anhydride) prepared in Example 1 was dissolved in 1.50 g methyl ethyl ketone. The solution was blended with 2.52 g (0.013 eq.) Epon 828 and 0.02 g dimethylbenzylamine. Total solids content was 73%. Thin, wet films of 3 mils thickness were drawn on glass plates. The plates were dried in a forced air oven at 100° F. for 30 minutes, then at 300° F. for 60 minutes. The films exhibited excellent adhesion to glass and metal surfaces. The films were unaffected by 10 minute exposure to xylene and 95% ethanol, but there was a slight effect upon 10 minute exposure to acetone and chloroform.

The copolymers of the present invention formed from 1,3-dioxepin and a maleic anhydride can undergo acid or base catalyzed lactonization. When the polymer is formed from 6,7-dihydro-1,3-dioxepin, a variety of five, six, and seven membered lactone rings form.

But when the copolymers comprise 4,7-dihydro-1,3-dioxepin and a maleic anhydride, the lactonization produces a poly(γ-crotonlactone) having the following general formula:

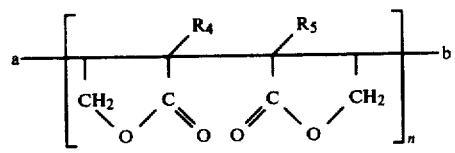

As stated above, the lactonization can be either catalyzed by an acid or a base. The acid catalyzed reaction can be conducted in an aqueous or alcoholic system or non-aqueous non-alcoholic system.

When the lactonization is conducted in an aqueous or alcoholic solution, a strong acid catalyst is used. The copolymer is mixed with a solution of alcohol and a strong acid or with the aqueous solution of a strong acid, whereupon it apparently completely hydrolyzes to form the poly (4 hydroxycrotonic acid) shown below:

$$a-\left[\begin{array}{c} R_4 \quad R_5 \\ | \quad | \\ -CH_2-CH_2-CO_2H-CO_2H \\ | \quad | \\ OH \quad OH \end{array}\right]_n-b$$

This completely hydrolyzed species, both in solution and more readily upon drying, forms the poly(γ-crotonlactone).

In the above reaction, a suitable strong acid is 0.1 N HCl. This reaction can be conducted at room temperature, but the rate of the hydrolysis is increased by heat. The best results were obtained in an isopropanol-acid solution. This method is further demonstrated by the following example:

EXAMPLE 31

A heterogeneous mixture of 2,2-dimethyl-4,7-dihydro-1,3-dioxepin-co-maleic anhydride in a 1:4 (w/w) water: isopropanol solution containing 0.5 g conc. HCl was agitated for 24 hours at room temperature whereupon the poly(γ-crotonlactone) was produced and precipitated out of solution.

The acid catalyzed lactonization can also be conducted in a non-aqueous and non-alcoholic system. According to this method, the copolymer is dissolved in an appropriate solvent such as those solvents listed for use in the solution polymerization method. To this solution, about 1% by weight of concentrated HCl based on the polymer weight is added. This solution is then heated, thereby causing the poly(γ-crotonlactone) to precipitate out of solution. This is further explained by way of the following example.

EXAMPLE 32

A 2-butone solution of copolymer 2,2-dimethyl-4,7-dihydro-1,3-dioxepin-co-maleic anhydride (25% solids), combined with 1% by weight conc HCl (based on polymer weight) and heated at 65°–70° C. for 5 hours produced a lactone polymer. Shortly after addition of HCl to the homogeneous solution at 65° C. polymer began precipitating from solution. The precipitated polymer was collected and purified. Infrared, elemental and NMR analyses showed that the 2,2-dimethyl-4,7-dihydro-1,3-dioxepin copolymer was substantially converted to a new polymer with lactone rings with $n_{inh}=0.12$ (0.4 g/100 ml DMF, 30° C.).

EXAMPLE 33

A 10 g sample of poly(2,2-dimethyl-4,7-dihydro-1,3-dioxepin-co-maleic anhydride) prepared in Example 1 was dissolved in 40.0 g 2-butanone and heated to 65° C. Six drops (0.29 g) concentrated HCl was added and the mixture was heated an additional 3.0 hours. The solution became cloudy immediately upon addition of acid, and a precipitate formed within 4 minutes. The reaction mixture was filtered and dried to yield 7.9 g polymer. Lactone formation was confirmed by ir analysis. Anhydride carbonyl stretching at 1850 and 1790 cm$^{-1}$ disappeared and a new band at 1760 cm$^{-1}$ was observed, and acetal stretching at 1060 cm$^{-1}$ disappeared.

The poly($\gamma$-crotonlactone) can also be formed by simply heating the solid 1,3-dioxepin maleic anhydride copolymer. This is a very slow method which is at present commercially impractical. This method is illustrated by the following example.

EXAMPLE 34

(Thermal rearrangement to Polylactone)

A 1.00 g sample of poly(2-isopropyl-4,7-dihydro-1,3-dioxepin-co-maleic anhydride), prepared in Example 3, was heated at a temperature of 236° C. for a period of 4 hours under nitrogen. 0.74 g polymer was isolated. IR analysis of the material confirmed rearrangement to polylactone had occurred.

The lactonization of the 1,3-dioxepin maleic anhydride copolymer can also be base catalyzed at room temperature using a strong base such as NaOH or Et$_3$N. In this instance, the anhydride moiety of the copolymer is hydrolyzed and the salt of the acid is formed. When this solution is made acid, the salt forms an acid which reacts with the dioxepin moiety, thereby forming the poly($\gamma$-crotonlactone).

The formed poly($\gamma$-crotonlactone) is useful as an epoxy curing agent and as a modifier in polyblends.

Having thus described our invention we claim:

1. A polymer having the following general formula:

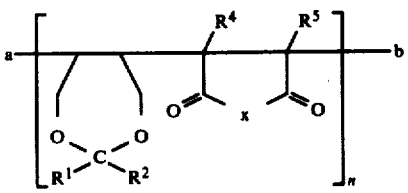

wherein X represents O or N-R$^3$; and R$^1$, R$^2$, R$^3$, R$^4$ and R$^5$ are selected from the groups consisting of alkyl, substituted alkyl, aryl, substituted aryl, and hydrogen; and n is an integer greater than or equal to about 10; and a and b are terminal groups of the polymer.

2. The polymer claimed in claim 1 wherein R$^1$ and R$^2$ are selected from the group consisting of alkyl and substituted alkyl and wherein R$^1$ is bonded to R$^2$.

3. The polymer claimed in claim 1 wherein R$^4$ and R$^5$ are selected from the group consisting of hydrogen, the halides and —CH$_3$.

4. The polymer claimed in claim 3 wherein R$^1$ and R$^2$ represent either hydrogen or a methyl group.

5. A polymer having the following general formula:

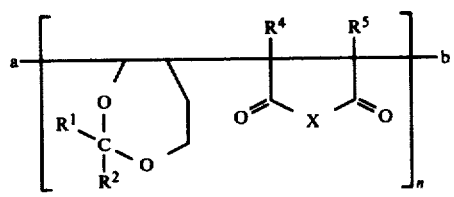

wherein X represents O or N-R$^3$; and R$^1$, R$^2$, R$^3$, R$^4$, and R$^5$ are selected from the group consisting of alkyl, substituted alkyl, aryl, substituted aryl, and hydrogen; and n is an integer greater than or equal to about 10; and a and b are terminal groups of the polymer.

6. The polymer claimed in claim 5 wherein R$^1$ and R$^2$ are selected from the group consisting of alkyl and substituted alkyl and wherein R$^1$ and R$^2$ are bonded to each other.

7. The polymer claimed in claim 5 wherein R$^4$ and R$^5$ are selected from the group consisting of hydrogen, halide and —CH$_3$.

8. The polymer claimed in claim 7 wherein R$^1$ and R$^2$ represent either hydrogen or a methyl group.

9. A polymer as claimed in claims 1, 2, 3, 4, 5, 6, 7 or 8, wherein X represents O.

10. A free radical initiated copolymerization product of a first monomer selected from the group consisting of the monomers shown in formulae A and B

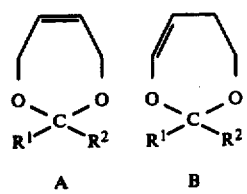

A      B and a second monomer having the following formula

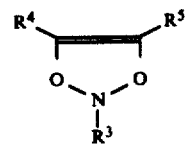

wherein R$^1$, R$^2$, R$^3$, R$^4$ and R$^5$ are selected from the group consisting of alkyl, substituted alkyl, aryl, substituted aryl and hydrogen.

* * * * *